Patented July 22, 1924.

1,502,422

UNITED STATES PATENT OFFICE.

HUGH S. COOPER, OF CLEVELAND, OHIO, ASSIGNOR TO KEMET LABORATORIES COMPANY, INC., A CORPORATION OF NEW YORK.

ZIRCONIUM CONTAINING COMPOSITION AND PROCESS OF MAKING THE SAME.

No Drawing. Application filed August 10, 1921. Serial No. 491,300.

*To all whom it may concern:*

Be it known that I, HUGH S. COOPER, a citizen of the United States, residing at Cleveland, in the county of Cuyahoga and State of Ohio, have invented certain new and useful Improvements in Zirconium Containing Compositions and Processes of Making the Same, of which the following is a specification.

This invention relates to improvements in processes of treating crude materials containing zirconium silicate for the production of a composition suitable for use as an opacifying agent in the enamel industry, and for other purposes.

Numerous attempts have been made to produce a satisfactory substitute for stannic oxid, which is now regarded as the standard opacifier for high grade enamels, and it has been shown that zirconium compounds have possibilities in this connection. Zirconium oxid is relatively satisfactory, but its high cost precludes its extensive use. In my application Ser. No. 456,742, filed March 29, 1921, I have shown that a cheap and effective zirconium opacifier may be prepared by special treatment of crude zirconium silicate, occurring in nature as the mineral zircon. The present invention comprises improvements in the process disclosed in said application.

The principal method which I have outlined in application Ser. No. 456,742, may be summarized as follows: Zircon is separated from associated minerals and is subjected to a wet-milling operation until it approaches a colloidal condition. It is next treated with an acid solution to dissolve iron and other impurities, after which it is thoroughly washed and dried. The purified material is preferably calcined at a temperature of about 1000° C. The resulting product gives an enamel of good whiteness, but of only fair opacity and insufficient luster. These deficiencies are corrected by using the purified zirconium silicate in connection with materials producing intense opacity and high luster, such as tin oxid.

By certain modifications and extensions of this process, as described herein, I am able to obtain from ferruginous zirconium silicate a material capable of independent use as an opacifier. Enamels prepared with no other opacifier than the product of my process are characterized by satisfactory whiteness, opacity, and brilliancy.

The zircon is first separated in any suitable way from associated minerals, unless these are capable of imparting desirable properties to the finished product. In the present method, either wet or dry milling may be used to break down the crystalline structure of the silicate. I prefer, however, to subject the material to a wet-milling operation, because when ground in this way it is more readily susceptible to the acid and alkali treatments to be described, and the covering power of the product is better than when dry grinding is adopted. The operation should be continued until the colloidal condition is approached; several days may be required for the completion of this step of the process.

The very finely subdivided material is drawn off from the mill, allowed to settle, and the supernatant liquid decanted. The residual sludge, preferably without drying, is treated with concentrated sulfuric acid in the proportion of 2 or 3 parts by weight of 93% acid to 1 part of wet silicate. Heat is applied and the mixture evaporated down to a pasty condition, or to dryness. The iron and other detrimental impurities in the mineral are converted into soluble sulfates by this treatment. The zirconium silicate itself is not chemically changed to any considerable extent, but it is nevertheless modified in a highly advantageous manner. The transformation may be due to a change in the physical condition of the silicate particles, or to a combined chemical and physical action. Whether or not these are the causes, I have found that the result is the production of an opacifier having much more satisfactory characteristics than when prior methods of preparation are used. The benefit to be derived from this treatment with regard to increased covering power and other desirable properties is sufficient to justify its use even when it is not necessary to remove iron compounds or the like.

After the acid treatment, the silicate is thoroughly washed. Preferably it is first placed in water, which is brought to the boiling point. The solution is then decanted, and the sludge subjected to repeated washing and decantation until all traces of soluble sulfates and sulfuric acid are removed. Due to the finely divided condition of the zircon and the high reactivity of the concentrated sulfuric acid, practically all of the iron compounds and similar impurities are rendered soluble. They are readily removed by the washing process described, leaving substantially pure zirconium silicate. I have found that an iron content of from 0.4% to 0.75% causes a yellow tinge in the finished enamel, and that more than 1.0% iron will render the silicate unfit for most enameling purposes. The process described reduces the iron to an amount substantially less than the percentages stated. The product at this stage is free from discoloration and highly voluminous. It may in some cases be used as an opacifier without further treatment.

I prefer, however, to subject it to calcination, as this results in improved brilliancy and opaquing qualities. The temperature of calcination may be about 1000° C. and the time of heating may be, for example, two hours. The silicate suffers no appreciable decomposition under these conditions.

The zirconium silicate opacifier prepared as described herein produces enamels equal in all respects to those in which tin oxid is the clouding agent. It is necessary, however, to use about one-third more of the silicate than of tin oxid in order to secure equivalent results. In general the amounts of silicate will range from 6% to 15% of the total weight of the enamel composition. The proportions may vary between these and even wider limits according to the degree of opacity desired or other conditions of the particular work in hand.

I have discovered further, that the high percentage of combined silica in the prepared zirconium silicate is largely responsible for the deficiency of that compound in opaquing capacity, as compared with an equal weight of tin oxid. In some cases, therefore, I prefer to subject the silicate, containing usually around 33% of combined silica, to a treatment with alkali and in this way reduce the silica content to the desired extent. When the silica is lowered to 10 to 15%, the resulting product is approximately the opacifying equivalent, weight for weight, of tin oxid. The percentage may vary between 7 and 25 without substantial departure from the desired result.

The alkali treatment is carried out as follows: Zirconium silicate, preferably subjected to the action of concentrated sulfuric acid, washed, and dried, as described above, is added to about 2½ times its weight of molten alkali metal hydroxid at a temperature of approximately 400° C. The silicate is advantageously added to the alkali in small batches, as the heat of reaction causes a rapid rise of temperature and considerable ebullition. When all of the material has been added and action ceases, heating is continued until the mass shows signs of solidifying. It is then poured on a suitable surface, such as a sheet of nickel, and allowed to cool.

The cooled fusion product is transferred to a vessel, hot water is added, and agitation is applied until all of the insoluble material is in suspension. It is then allowed to settle, the supernatant liquor is poured off, and the solids are washed several times by addition of water and decantation. The greater portion of the alkali, alkali metal silicate and other soluble salts, is removed in this way. When the liquor shows signs of turbidity the solution is boiled for several hours to break up the alkali metal zirconate formed during the fusion. Residual alkali is removed by thorough washing, preferably through a filter press. The removal of alkali is preferably as complete as possible, though when present in amounts less than 2% it is not particularly objectionable. The material, after final drying and calcining, contains about 12% of silica. It is the full equivalent of stannic oxid with respect to luster, opacity and freedom from discoloration when used in enamel compositions.

The reduction of the silica content may be regulated by adjusting the amount of alkali and time of fusion. For example, with a weight of alkali only twice that of the zirconium silicate and a somewhat shorter period of reaction, the residual silica amounts to about 23%. The preferred alkali is sodium hydroxid, but the other alkali metal hydroxids and alkali metal carbonates may be used. The fusion process described is not limited to use with zircon treated according to the process herein set forth. The fine subdivision of the wet-milled and acid treated silicate, however, renders it especially suited for the subsequent alkali treatment. Compositions containing any desired proportion of silica might, of course, be prepared by mixing zirconium oxid with the silicate. Such compositions however, do not give as good results as those prepared by chemical removal of silica, possibly because in the latter a lower silicate of zirconium is present, rather than a mechanical mixture of oxid and silicate.

A number of valuable clouding agents, such as compounds of cerium, thorium, and titanium, are frequently found associated with zircon. The silicate prepared according to the present process does not require their presence to enhance its opacifying qualities, but in some cases the associated substances may be retained without disadvantage. Omitting the step of segregating the minerals, the process as described above may be followed.

In using zirconium silicate with undiminished silica content as an opacifier, the fusible enamel components, preferably without the opacifier, are melted and tapped off into water in the usual way. The frit so produced, with the proper amount of dry silicate, is subjected to wet-milling for several hours. The silicate shows no tendency to go into solution, and the enamel produced is much more lustrous than when the zirconium compound is introduced only toward the end of the milling process, in accordance with prior practice with zirconium oxid. The resulting product is preferably aged for several days, as this tends to produce a better color. When alkali treated silicate is used, it may be added as just described, or near the end of the milling process. Enamel compositions prepared as described may be applied in ways well understood in the art.

The product claimed herein is not limited to use as an enamel opacifier. It may be advantageously used also as a paint pigment or rubber filler, and for other purposes.

I claim:

1. Process of treating zirconium silicate, which comprises wet-milling the silicate to a condition of extreme fineness, reacting upon the milled material with concentrated sulphuric acid, and removing residual acid and substances rendered soluble thereby.

2. Process of treating naturally occurring zirconium silicate, which comprises wet-milling the silicate to a condition of extreme fineness, treating the milled material with concentrated sulphuric acid, and then washing, drying, and calcining the material.

3. Process of treating naturally occurring zirconium silicate for use as an enamel opacifier, which comprises milling the silicate to finely divided condition and treating the milled material with concentrated sulfuric acid.

4. Process according to claim 3, in which the mixture of silicate and acid is subjected to heat sufficient to evaporate the mixture at least to a pasty consistency.

5. Process according to claim 4, in which the evaporation is continued to dryness.

6. Process of treating naturally occurring zirconium silicate, which comprises wet-milling the silicate to a condition of extreme fineness, acting upon the milled material with concentrated sulfuric acid, under conditions such as to obtain a substantially dry product, and washing, drying and calcining the product.

7. Process of treating zirconium silicate which comprises milling the silicate to a condition of extreme fineness, reacting upon the milled material with concentrated sulphuric acid, removing water soluble substances, subjecting the material to the action of alkali at high temperature, and removing excess alkali.

8. Process according to claim 7, in which the alkali treatment is a fusion with alkali metal hydroxid at approximately 400° C.

9. Process according to claim 8, in which one part of silicate is added to about $2\frac{1}{2}$ parts of alkali.

10. Process of enhancing the opacifying quality of zirconium silicate, comprising reducing the silica content of said compound to between 7 and 25%, by a treatment with alkali and subsequent removal of water soluble substances.

11. Process of enhancing the opacifying quality of zirconium silicate, comprising fusing said compound with approximately $2\frac{1}{2}$ times its weight of alkali metal hydroxid, and removing water soluble substances from the fusion product.

12. Process of preparing an enamel composition, comprising finely dividing and purifying a naturally occurring zirconium silicate, preparing a frit from fusible enamel constituents, and reducing said frit to finely divided condition by a wet-milling operation, said silicate being commingled with the frit prior to said operation.

13. Zirconium silicate such as may be obtained by reacting upon the naturally occurring silicate with concentrated sulfuric acid, and existing as a white, brilliant, highly voluminous powder.

14. Zirconium silicate such as may be obtained by reacting upon the naturally occurring silicate with concentrated sulfuric acid, and existing as a white, brilliant, highly voluminous powder containing less than 0.75% iron.

15. As an enamel opacifier, substantially pure, finely divided zirconium silicate having physical and chemical characteristics due to contact with concentrated sulfuric acid, such characteristics enabling the silicate to impart high luster and opacity to enamels.

16. As an enamel opacifier, the zirconium containing product resulting from the reduction of the silica content of zirconium silicate to 7 to 25%.

17. Zirconium silicate in which the silica content has been reduced by treatment with alkali to 7 to 25%, said silicate containing less than 1% iron and less than 2% alkali.

18. Zirconium silicate in which the silica content has been reduced by treatment with alkali to 10 to 15%, said silicate containing less than 0.4% iron and less than 2% alkali.

In testimony whereof, I affix my signature.

HUGH S. COOPER.